US012563067B2

(12) United States Patent
Shen et al.

(10) Patent No.: US 12,563,067 B2
(45) Date of Patent: Feb. 24, 2026

(54) IDENTIFYING ANOMALOUS ACTIVITIES IN A CLOUD COMPUTING ENVIRONMENT

(71) Applicant: NetApp, Inc., San Jose, CA (US)

(72) Inventors: Yun Shen, Bristol (GB); Azzedine Benameur, Fairfax, VA (US); Alex Xeong-Hoon Ough, Round Rock, TX (US); Idan Schwartz, Tel-Aviv (IL)

(73) Assignee: NetApp, Inc., San Jose, CA (US)

( * ) Notice: Subject to any disclaimer, the term of this patent is extended or adjusted under 35 U.S.C. 154(b) by 117 days.

(21) Appl. No.: 18/344,664

(22) Filed: Jun. 29, 2023

(65) Prior Publication Data

US 2024/0007492 A1 Jan. 4, 2024

Related U.S. Application Data

(60) Provisional application No. 63/356,827, filed on Jun. 29, 2022.

(51) Int. Cl.
*H04L 9/40* (2022.01)
*H04L 41/16* (2022.01)

(52) U.S. Cl.
CPC .......... *H04L 63/1425* (2013.01); *H04L 41/16* (2013.01); *H04L 63/1416* (2013.01)

(58) Field of Classification Search
CPC ......................... G06N 3/0464; H04L 63/1416
See application file for complete search history.

(56) References Cited

U.S. PATENT DOCUMENTS

| | | | |
|---|---|---|---|
| 11,012,457 B1 * | 5/2021 | Dziduch | ............. H04L 63/1416 |
| 11,611,571 B2 | 3/2023 | Lindquist | |
| 2019/0129821 A1 | 5/2019 | Lee et al. | |

(Continued)

FOREIGN PATENT DOCUMENTS

| | | |
|---|---|---|
| CN | 107295010 A | 10/2017 |
| WO | 2020248291 A1 | 12/2020 |

OTHER PUBLICATIONS

Abou-Amal O., "Watchdog Detects Kubernetes Anomalies and Surfaces Root Causes," Datadog, 2020, pp. 1-10.

(Continued)

*Primary Examiner* — Barbara B Anyan

(74) *Attorney, Agent, or Firm* — Jaffery Watson Hamilton & DeSanctis LLP

(57) ABSTRACT

Systems and methods for identifying anomalous activities in a cloud computing environment are provided. According to one embodiment, a customer's infrastructure may be fortified by leveraging deep learning technology (e.g., an encoder-decoder machine-learning (ML) model) to predict events in the cloud environment. During a training phase, the ML model may be trained to make a prediction regarding a next event based on a predetermined or configurable length of a sequence of contextual events. For example, historical events (e.g., cloud application programming interface (API) events logged to a cloud activity trace) observed within the customer's cloud infrastructure over the course of a particular date range may be split into appropriate event/context pairs and fed to the ML model. Subsequently, during a run-time anomaly detection phase, the ML model may be used to predict a next event based on a sequence of immediately preceding events to facilitate identification of anomalous activity.

21 Claims, 8 Drawing Sheets

100 —▶

(56)                    References Cited

U.S. PATENT DOCUMENTS

| | | |
|---|---|---|
| 2020/0236123 A1 | 7/2020 | Kessel et al. |
| 2022/0101192 A1 | 3/2022 | Patel |
| 2022/0374943 A1* | 11/2022 | Barnwal .............. G06N 3/0464 |

OTHER PUBLICATIONS

"Algorithms," Datadog, 2023, pp. 1-5.
"Amanzon Fraud Detector: User Guide," AWS, pp. 1-170.
Amazon Elastic Compute Cloud: API Reference, AWS, API Version Nov. 15, 2016, pp. 1-2853.
"Amazon Look Out Metrics: Developer Guide," AWS, pp. 1-98.
"Amazon Simple Storage Service: API Reference," AWS, API Version Mar. 1, 2006, pp. 1165.
"AWS Identity and Access Management," API Reference, API Version May 8, 2010, pp. 1-593.
"AWS Security Token Service; API Reference," AWS, API Version Jun. 15, 2011, pp. 1-62.
Chang E., et al., "3 Scenarios Where Machine Learning Makes for Smarter Alerts," Datadog, 2017, pp. 1-7.
Chen B., "Automated Root Cause Analysis With Watchdog RCA," Datadog, 2022, pp. 1-8.
"Cloud Security Management," Datadog, 2023, pp. 1-6.
"Cloud SIEM," Datadog, 2023, pp. 1-5.
"Cloud_Insights_documentation," NetApp, 2023, pp. 1-672.
Du M., et al., "DeepLog: Anomaly Detection and Diagnosis from System Logs Through Deep Learning," Proceedings of the 2017 ACM SIGSAC conference on computer and communications security, 2017, pp. 1-14.
Guo H., et al., "LogBERT: Log Anomaly Detection via BERT," 2021 International Joint Conference on Neural Networks (IJCNN), 2021, pp. 1-13.

"Infrastructure Application Monitoring as a Service," Datadog, 2023, pp. 1-12.
"Log Analysis Correlation," Datadog, 2023, pp. 1-6.
"Log Analytics," Datadog, 2023, pp. 1-8.
"Logging Insights Events for Trails," AWS CloudTrail, 2023, pp. 1-13.
Masson C., "Robust Statistical Distances for Machine Learning," Datadog, 2017, pp. 1-12.
Maston J., "Introducing Anomaly Detection in Datadog," Datadog, 2016, pp. 1-10.
Megiddo A., "How You Can Use Amazon GuardDuty to Detect Suspicious Activity Within Your Aws Account," AWS Security Blog, 2021, pp. 1-12.
Menezes B., "Watchdog: Auto-Detect Performance Anomalies Without Setting Alerts," Datadog, 2018, pp. 1-8.
Obey J., et al., "Detect Security Threats With Anomaly Detection Rules," Datadog, 2021, pp. 1-6.
Shen Y., et al., "Tiresias: Predicting security events through deep learning," Proceedings of the 2018 Acm Sigsac Conference on Computer and Communications Security, 2018, pp. 1-14.
Thomson N., et al., "Accelerate Incident Investigations With Log Anomaly Detection," Datadog, 2022, pp. 1-9.
Thomson N., "Understand the Scope of User Impact With Watchdog Impact Analysis," Datadog, 2021, pp. 1-10.
Tschannen M., et al., "Recent Advances in Autoencoder-Based Representation Learning," Machine Learning, 2018, pp. 1-25.
Van Ede, T., et al., "DEEPCASE: Semi-Supervised Contextual Analysis of Security Events," 2022 IEEE Symposium on Security and Privacy, 2022, pp. 1-18.
"Watchdog Insights for Logs," Datadog, 2023, pp. 1-6.
"Zebrium Root Cause as a Service (RCaaS) Documentation," ScienceLogic, Release EA79, pp. 1-217.

* cited by examiner

Cloud Provider 320

Internal Cloud API Call 307

OR

Query Cloud Activity Trace 303

Event Information 304

API Event Notification 308

Query Cloud Activity Trace 309

Contextual Events 310

Security Service 330

Perform Anomaly Detection Training 340

Perform Run-Time Anomaly Detection 350

Training Initiation 301

Training Complete 305

Cloud API Call 306

Conditional Anomaly Notification 311

Customer 302

300

400

500

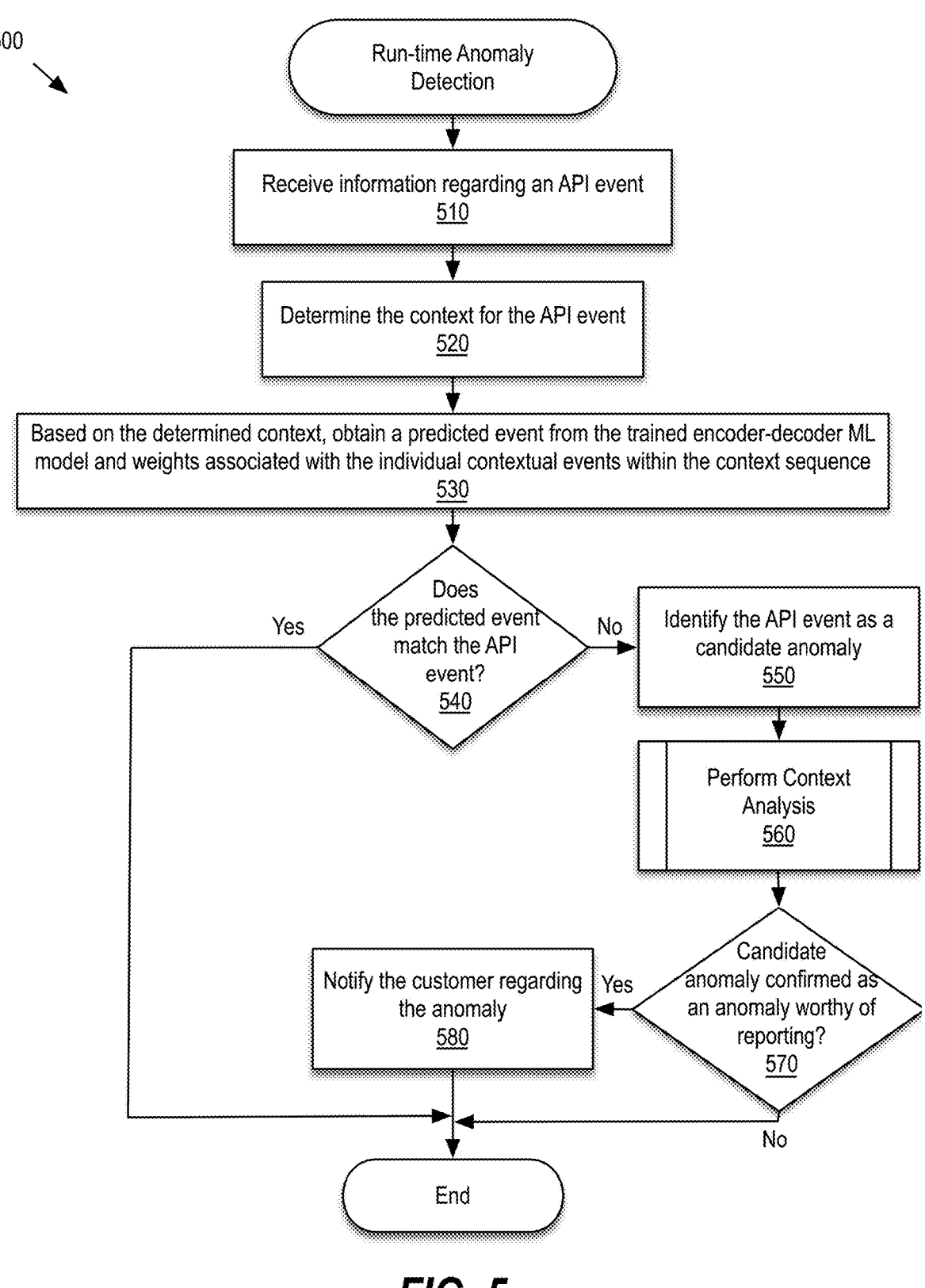

Run-time Anomaly
Detection

Receive information regarding an API event
510

Determine the context for the API event
520

Based on the determined context, obtain a predicted event from the trained encoder-decoder ML
model and weights associated with the individual contextual events within the context sequence
530

Does
the predicted event
match the API
event?
540

Yes

No

Identify the API event as a
candidate anomaly
550

Perform Context
Analysis
560

Notify the customer regarding
the anomaly
580

Yes

Candidate
anomaly confirmed as
an anomaly worthy of
reporting?
570

No

End

IDENTIFYING ANOMALOUS ACTIVITIES IN A CLOUD COMPUTING ENVIRONMENT

CROSS-REFERENCE TO RELATED PATENTS

This application claims the benefit of priority to U.S. Provisional Application No. 63/356,827 filed on Jun. 29, 2022, which is hereby incorporated by reference in its entirety for all purposes.

BACKGROUND

Field

Various embodiments of the present disclosure generally relate to cloud security. In particular, some embodiments relate to an approach for making use of a cloud activity trace to learn the context that leads to a given event, thereby allowing a trained deep learning anomaly detection machine-learning (ML) model (e.g., an encoder-decoder ML model) to make a prediction regarding a next event following a particular sequence of events and facilitate the identification of anomalous activities in a cloud computing environment that goes beyond the capabilities of heuristic-based approaches.

Description of the Related Art

Cloud environments or cloud computing platforms (e.g., Amazon Web Services (AWS), Google Cloud Platform (GCP), and Microsoft Azure) are complicated with many services offered by the cloud providers (e.g., Amazon, Google, and Microsoft). Commonly, these environments offer logs or services (e.g., AWS CloudTrail, Azure ActivityLog, GCP Cloud Audit Logs) to monitor customers' activities. Leveraging these logs, which are referred to herein generally as "cloud activity traces," customers purportedly are provided with the ability to gain visibility into their infrastructures, identify potential breach or security issues, comply with regulations, diagnose problems, etc. These logs purportedly also enable customers to understand their security postures so as to prevent financial/reputation loss in case of a security breach.

SUMMARY

Systems and methods are described for identifying anomalous activities in a cloud computing environment. According to one embodiment, an encoder-decoder machine-learning (ML) model is trained based on historical events associated with infrastructure utilized by a particular customer, in which the infrastructure is accessible to the particular customer via an application programming interface (API) exposed by a cloud environment providing the infrastructure. A cloud activity trace to which the cloud environment logs API events relating to the infrastructure is then monitored. An actual API event is observed that is associated with the infrastructure immediately following a set of contextual events representing a sequence of a pre-determined or configurable number of API events relating to the infrastructure logged by the cloud environment to the cloud activity trace. The trained encoder-decoder ML model is caused to make a prediction regarding an API event that is expected to follow the set of contextual events. A determination is made regarding whether the predicted API event differs from the actual API event. If so, the actual API event is flagged as a candidate anomaly for further evaluation. An impact score of the candidate anomaly is determined based on one or more of a severity of the candidate anomaly, a user role associated with the set of contextual events, and one or more resources of the infrastructure affected by the candidate anomaly. An administrative user of the particular customer is conditionally notified regarding anomalous activity associated with the infrastructure based on the determined impact score.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 5 is a flow diagram illustrating a set of operations for performing run-time anomaly detection in accordance with an embodiment of the present disclosure.

DETAILED DESCRIPTION

Figure 1:
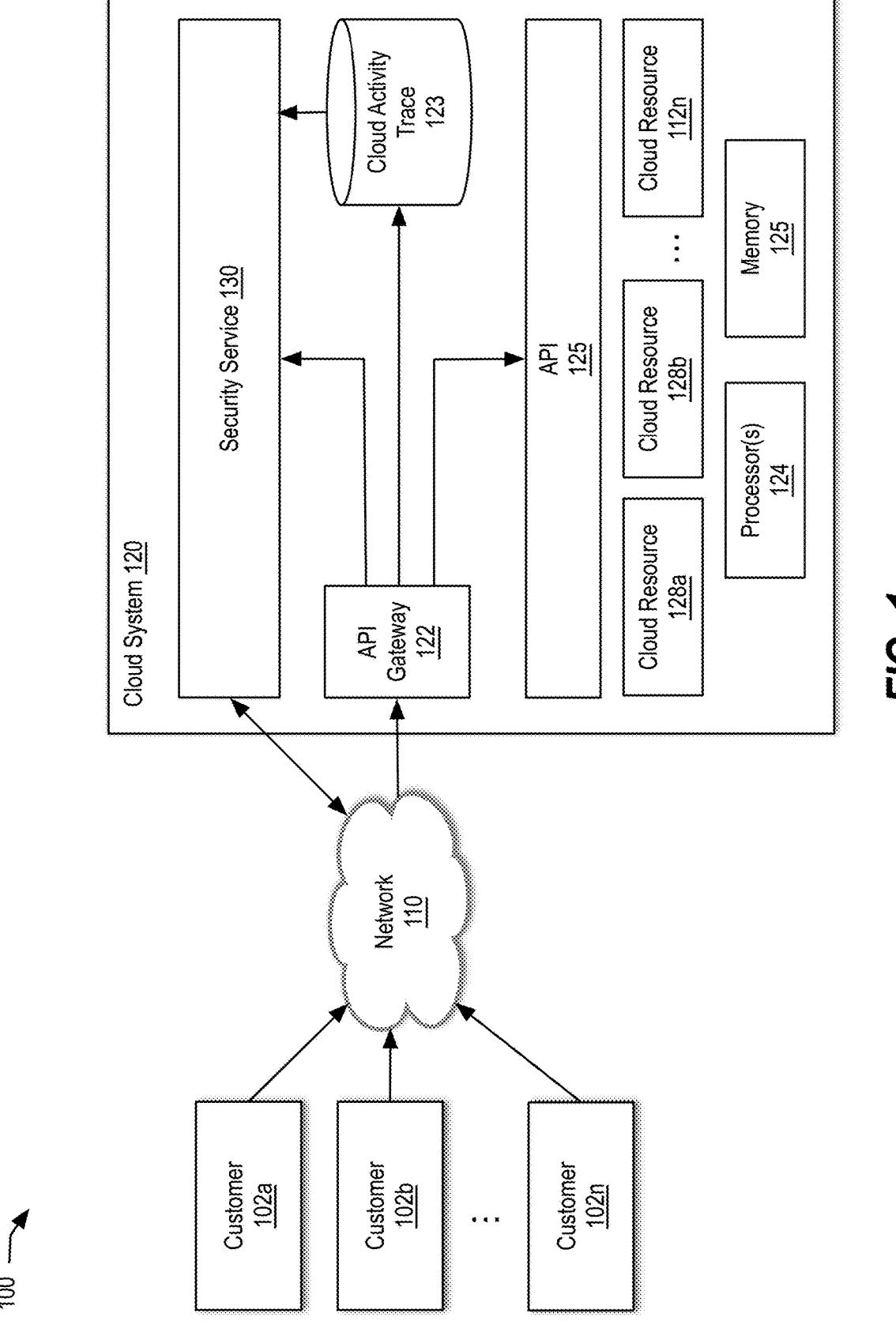
FIG. 1 is a block diagram illustrating a cloud environment according to some embodiments of the present disclosure.

Systems and methods are described for identifying anomalous activities in a cloud computing environment. As noted above, cloud providers make available various forms of cloud activity traces that are supposed to provide customers with visibility into the events occurring within their infrastructures. One major challenge with cloud activity traces is that they produce an extremely large volume of data. In order to appreciate the size of such cloud activity traces, consider an enterprise with thousands of active virtual machines (VMs) across different availability zones. With the potential for thousands of API calls being made every minute from both users and applications, it is very time-consuming and resource-intensive (if not totally impossible) to manually review these cloud activity traces and identify any suspicious activity. It's like trying to find a needle in a haystack.

Additionally, cloud activity traces can be complex and difficult to understand. Atomic/standalone events are hardly useful to understand the scope of a user action, especially for those who are not familiar with the technical details of cloud providers. This can make it burdensome for non-technical users to spot potential threat indicators, even if they are able to inspect and analyze the contents of these cloud activity traces. The chaotic nature of such cloud activity traces, for example, due to concurrency and multiple users/roles adds further complexity. Furthermore, the high volume of activities being logged has an obfuscating effect.

Existing cloud security products generally focus on (i) assisting customers to meet certain business or regulatory requirements and to be audit-ready for key compliance frameworks; or (ii) facilitating the establishment of ad-hoc rules that are consistent with best practices (e.g., not making instances visible to the world, etc.). While existing cloud security products certainly have some value, they are limited by virtue of their inability to detect anomalous activities not previously observed or otherwise not contemplated by a particular set of heuristic rules. As a result, existing cloud security offerings cannot identify attackers' lateral movements within cloud environments, leading to inevitable security breaches and/or data loss.

In order to fortify customers' infrastructure within cloud environments, embodiments of the present disclosure leverage the latest deep learning technology to predict events in cloud environments. For example, as described further below, in one embodiment, a security service operable within the cloud environment makes use of a deep learning anomaly detection ML model in the form of an encoder-decoder machine-learning (ML) model as part of an anomaly detection engine. During a training phase, the encoder-decoder ML model may be trained to make a prediction regarding a next event based on a predetermined or configurable length of a sequence of events, which may be referred to herein as a context sequence or contextual events. For example, historical events (e.g., cloud application programming interface (API) events logged to a cloud activity trace) observed within a particular customer's cloud infrastructure over the course of a particular date range may be split into appropriate event/context pairs and fed to the encoder-decoder ML model.

Subsequently, during a run-time anomaly detection phase, the security service may monitor the cloud activity trace to identify anomalous events. Depending upon the particular implementation, an API gateway within the cloud environment may notify the security service as cloud API events occur or the security service may poll the cloud activity trace for newly received events. The security service may request the encoder-decoder ML model to predict an event based on a sequence of events immediately preceding an event at issue (e.g., an event just observed by the API gateway or just logged to the cloud activity trace). When the predicted event matches the event at issue, the event at issue is consistent with that which is expected and no further action need be taken. However, when the predicted event does not match the event at issue, the event may be flagged as a candidate anomaly for further evaluation. In one embodiment, rather than notifying a customer of every potential anomalous event, the candidate anomalies may be filtered to reduce alerting to those anomalies deemed worthy of generating a notification to the customer. For example, a given candidate anomaly may be evaluated to determine whether it falls into a critical operations category (e.g., an operation that raises a security concern), modifies certain metadata (e.g., account, resources, cloud provider, Internet Protocol (IP) addresses), and/or satisfies certain time-related criteria (e.g., day of the week, hour of the day, etc.). Responsive to confirming the candidate anomaly, the customer may be notified. According to one embodiment, the anomaly notification may include information regarding the relative contribution of one or more particular events of the context sequence to the anomaly being reported.

While various examples may be described with reference to a particular cloud service provider (e.g., Amazon), a particular cloud environment or platform (e.g., AWS), and particular internal services provided to customers by the particular cloud service provider, it is to be appreciated the methodologies described herein are equally applicable to other cloud providers (e.g., Google and Microsoft) and their respective cloud environments and associated services.

While in the context of various examples herein training of an ML model and prediction by the ML model may be described at an organizational level (e.g., based on cloud activity trace(s) for a cloud account representing an organization cloud account for an organization as a whole), it is to be appreciated the methodologies described herein are equally applicable to cloud accounts underneath or otherwise associated with the organizational level cloud account. As such, the training and/or prediction described herein may be performed at the organizational level, a sub-account level (including one or more sub-accounts within the organization's cloud account), or both. For example, the training and/or prediction described herein may be performed based on cloud activity trace(s) associated with a cloud account for a single user, a group of users, a particular cloud service, a particular group of cloud services, etc.

While in the context of various examples herein behaviors and actions (e.g., API events) may be described as being initiated by a user (a human user), it is to be appreciated such behaviors and actions may be initiated by automation associated with a particular user (e.g., a process configured to be run by an automation script or AWS Lambda by an IAM user associated with an organization's cloud account responsive to a predetermined event or a fixed schedule).

While in the context of various examples herein inputs may be described as one or more cloud activity traces or logs from a particular cloud environment, it is to be noted that inputs may comprise logs from multiple cloud environments and/or multiple services within the same or different cloud environments. Thus, the deep learning anomaly detection ML model described herein can perform cross-environment, cross-platform, cross-services, cross-application and/or cross-event analysis, combining log data (e.g., data, metadata of activity logs, access logs and/or the like) from various events, times, dates, services, applications, environments, VMs, access points, customer entities, accounts, concurrent logs/entries and/or the like.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Terminology

Brief definitions of terms used throughout this application are given below.

A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers, unless expressly stated otherwise.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

As used herein a "cloud," "cloud system," "cloud platform," and/or "cloud environment" broadly and generally refers to a platform through which cloud computing may be delivered via a public network (e.g., the Internet) and/or a private network. The National Institute of Standards and Technology (NIST) defines cloud computing as "a model for enabling ubiquitous, convenient, on-demand network access to a shared pool of configurable computing resources (e.g., networks, servers, storage, applications, and services) that can be rapidly provisioned and released with minimal management effort or service provider interaction." P. Mell, T. Grance, The NIST Definition of Cloud Computing, National Institute of Standards and Technology, USA, 2011. The infrastructure of a cloud may be deployed in accordance with various deployment models, including private cloud, community cloud, public cloud, and hybrid cloud. In the private cloud deployment model, the cloud infrastructure is provisioned for exclusive use by a single organization comprising multiple consumers (e.g., business units), may be owned, managed, and operated by the organization, a third party, or some combination of them, and may exist on or off premises. In the community cloud deployment model, the cloud infrastructure is provisioned for exclusive use by a specific community of consumers from organizations that have shared concerns (e.g., mission, security requirements, policy, and compliance considerations), may be owned, managed, and operated by one or more of the organizations in the community, a third party, or some combination of them, and may exist on or off premises. In the public cloud deployment model, the cloud infrastructure is provisioned for open use by the general public, may be owned, managed, and operated by a cloud provider (e.g., a business, academic, or government organization, or some combination of them), and exists on the premises of the cloud provider. The cloud service provider may offer a cloud-based platform, infrastructure, application, or storage services as-a-service, in accordance with a number of service models, including Software-as-a-Service (SaaS), Platform-as-a-Service (PaaS), Infrastructure-as-a-Service (IaaS), and/or Function-as-a-Service (FaaS). In the hybrid cloud deployment model, the cloud infrastructure is a composition of two or more distinct cloud infrastructures (private, community, or public) that remain unique entities, but are bound together by standardized or proprietary technology that enables data and application portability (e.g., cloud bursting for load balancing between clouds).

As used herein "cloud infrastructure" or simply "infrastructure" generally refers to cloud services, infrastructure, platforms, or software that are hosted by cloud service providers and made available to users through the Internet.

As used herein a "cloud resource" or simply a "resource" generally refers to an entity that a customer can make use of or with which a customer can work. Various non-limiting examples of resources that may be made available or delivered to cloud computing customers of cloud service providers via the cloud infrastructure of a cloud service provider include storage, processing power, databases, networking, analytics, artificial intelligence, and software applications. In the context of AWS, various non-limiting examples of resources include an Amazon EC2 instance (e.g., a virtual server or a virtual machine), an AWS CloudFormation stack, an Amazon S3 bucket, hard-disk drive (HDD) or solid-state drive (SSD)-based storage, data transfer, domain name system (DNS) management, IP addresses, and Identity and Access Management (IAM) users.

As used herein an "API event" generally refers to an event associated with an API exposed by a cloud environment or by a service (e.g., Amazon EC2, Amazon Relational Database Service (RDS), AWS IAM, AWS Security Token Service (STS), Amazon Simple Storage Service (S3), or the like) provided by the cloud environment. Non-limiting examples of an API event include account activity, service events, management events, data events, and the like associated with a cloud account of a cloud environment that provides infrastructure for use by a number of cloud customers or tenants via their respective organizational cloud accounts or sub-accounts associated therewith.

A used herein a "cloud activity trace" generally refers to a log or service associated with a cloud environment to which events associated with a given customer's cloud account, sub-account, or cloud infrastructure are recorded. Depending on the cloud activity trace at issue, information regarding account activity by users associated with the particular customer's cloud account with the cloud environment and/or usage of an API exposed by the cloud environment or by a service provided by the cloud environment may be recorded by the cloud activity trace. For example, one or more of actions taken on the account (e.g., events related to creation, modification, and/or deletion of resources), who (e.g., which user) made the request, the services used, the actions performed, parameters for the actions, and the response elements returned by the services may be recorded by a cloud activity trace. Non-limiting examples of a cloud activity trace include event logs (e.g., AWS CloudTrail, Azure ActivityLog, and GCP Cloud Audit Logs) and/or activity logs, which record the activity of cloud accounts initiated via a web console, a command line interface (CLI), or via scripts leveraging APIs.

As used herein an "encoder-decoder machine-learning model" generally refers to a deep learning technique based on a sequential autoencoder-decoder architecture. In essence, such a model is trained to reconstruct the input data. An encoder compresses the input into a lower-dimensional representation, also known as the "latent space," and then a decoder uses this representation to reconstruct the original input. Further details regarding encoder-decoder ML models is provided by M. Tschannen, O. Backem, and M. Lucic, "Recent Advances in Autoencoder-Based Representation Learning," the Conference on Neural Information Processing Systems Advances in Neural Information Processing, 2018, which is hereby incorporated by reference in its entirety for all purposes.

As used herein a "set of contextual events," "contextual events," or simply "context" generally refers to events preceding a given API event at issue. In some examples, the context is represented by a sequence of consecutive events immediately preceding a given API event at issue. In various examples, the set of contextual events has a predefined or configurable context size, for example, including about 10 to 30 events.

As used herein a "candidate anomaly" generally refers to an observed (or actual) API event that differs from an API event predicted by an ML model based on a set of contextual events.

As used herein an "anomalous activity" or "anomalous event" generally refers to a candidate anomaly having an impact score that meets a predetermined or configurable threshold Example Cloud Environment FIG. 1 is a block diagram illustrating a cloud environment 100 according to some embodiments of the present disclosure. The cloud environment 100 may include, among other things, one or more customers 102a-n, a cloud system 120, and a network 110 through which the customers 102a-n and the cloud system 120 may communicate with each other. The network 110 may be, for example, the Internet, a local area network, a wide area network, and/or a wireless network (to name a few examples). The network 110 may include a variety of transmission media including cables, optical fibers, wireless routers, firewalls, switches, gateways, and/or other devices to facilitate communications between one or more of the aspects of the environment 100.

Cloud system 120 may be a provider of cloud infrastructure for one or more customers 102a-n. Cloud system 106 may provide a variety of cloud computing solutions, such as infrastructure as a service (IaaS), software as a service (SaaS), and/or platform as a service (PaaS) as some examples. For example, cloud system 120 may be a public cloud provider, non-limiting examples of which include Amazon, Microsoft, and Google. The cloud system 120 may represent a multi-tenant cloud provider that may host a variety of virtualization tools that customers 102a-n may request to host or otherwise run one or more applications (e.g., via the network 110). Alternatively, the cloud system 120 may represent a private cloud provider, such as an enterprise cloud for a given organization.

Cloud system 120, generally, may provide infrastructure including any set of resources used for orchestrating, deploying, managing, and/or executing one or more containers, virtual machines, or other hosted virtualization tools. Resources may include, but are not limited to, CPU resources, memory resources, caching resources, storage space resources, communication capacity resources, etc. that a virtualization tool such as a container may use for execution of one or more workloads for customers 102a-n. These resources are illustrated in FIG. 1 as cloud resources 128a-n, of cloud system 106. These may represent any number of cloud resources in any of a variety of combinations. As just one example, the cloud resources 128a-n may be in the form of one or more virtual servers or virtual machines (e.g., AWS Elastic Compute Cloud (EC2) instances), or other instance types made available by a cloud provider to a customer (e.g., an organization or individual) through a cloud account with the cloud provider.

A given customer may make use of an API gateway 122 (e.g., the AWS API gateway) as an entry point for client requests directed to an API 125 relating to the provided infrastructure. The API gateway 122 may be responsible for, among other things, logging information regarding user activity and API usage within a cloud activity trace 123 (e.g., AWS Cloud Trails). For example, responsive to an infrastructure-level action (e.g., a resource operation) taken by a user, role, or a service associated with a particular organization's cloud account, the API gateway 122 may cause an event to be logged to the cloud activity trace 123, including, for example, the time, date, API method, user, role, and the like. The API 125 may represent an API of a web service for controlling access to other services offered by the cloud provider or may represent an API of an internal service offered by the cloud provider to its customers. Cloud providers offer a variety of services to their customers via their respective cloud environments (e.g., AWS) or cloud computing platforms including, but not limited to: (i) cloud computing services or IaaS (e.g., Amazon EC2) offering security and resizable compute capacity to enable easy access and usability to developers for web-scale cloud computing, (ii) database services (e.g., Amazon RDS) that make database configuration, management, and scaling easy in the cloud, (iii) object storage services or IaaS (e.g., Amazon Simple Storage Service (S3)), (iv) serverless compute services or FaaS (e.g., Amazon Lambda) that allow customers to run code without owning or managing servers, (v) control access dashboards (e.g., Amazon Cognito) for on-boarding users through sign-up and sign-in features to web and mobile apps, (vi) storage services (e.g., Amazon Glacier) that provide secure, flexible, and affordable cloud storage classes for data caching and/or prolonged backup, (vii) managed messaging solutions (e.g., Amazon Simple Notification Service (SNS)) that provide low-cost infrastructure for bulk message delivery (e.g., to mobile users), (viii) virtual private servers (e.g., Amazon Lightsail) to provide an easy on-ramp for users getting started with cloud computing platforms, (ix) virtual private cloud (VPC) services (e.g., Amazon VPC) that enable customers to set up an isolated section of a cloud computing platform where they can deploy cloud resources at scale in a virtual environment, (x) serverless streaming data services (e.g., Amazon Kinesis) for processing and analyzing streaming data, (xi) identity and access management services (e.g., Amazon IAM) that provide secure access and management of resources in a secure and compliant manner via creation and management of users and groups having defined permissions for individual resources, (xii) document databases (e.g., Amazon DynamoDB), (xiii) managed message queuing facilities (e.g., Amazon Simple Queue Service (SQS)) that enable customers to decouple and scale microservices, distributed systems, and serverless apps, (xiv) in-memory data storage services (e.g., Amazon ElastiCache) that facilitate effortless setup, running, and scaling of popular open-source, in-memory data storages in the cloud, (xv) data analysis services (e.g., Amazon Athena) that facilitate analysis of data stored in an object storage service, (xvi) software-defined infrastructure services (e.g., AWS CloudFormation) that allow an information technology (IT) setup in which developers or operations teams continuously manage and provision a technological stack for an application via software instead of manually configuring separate hardware devices and operating systems, (xvii) managed ML services (e.g., Amazon SageMaker) that allow data scientists and developers to quickly and easily build and train various types of ML models, (xviii) serverless elastic file storage services (e.g., Amazon Elastic File System), (xix) managed cluster platforms (e.g., Amazon EMR (formerly, Amazon Elastic MapReduce)) that simplify the running of bid data frameworks, such as Apache Hadoop and Apache Spark, within their cloud environments, (xx) high-performance block storage service (e.g., Amazon Elastic Block Store (EBS)) that provides block level storage volumes as a block-level storage device, for example, for use with cloud computing services (e.g., Amazon EC2), (xxi) managed Kubernetes services (e.g., Amazon Elastic Kubernetes Service (EKS)), (xxii) managed container registry services (e.g., Amazon Elastic Container Registry (ECR)) that facilitates storing, sharing, and deploying container images, (xxiii) container orchestration services (e.g., Amazon Elastic Container Service (ECS)), (xxiv) managed services (e.g., AWS Config) that provide resource inventory, configuration history, and configuration changes notifications, (xxv) web services (e.g., AWS Secure Token Service (STS)) for providing temporary, limited-privilege credentials for identity and access management services (e.g., Amazon IAM), (xxvi) managed continuous integration services (e.g., AWS CodeBuild) that compile source code, run tests, and produce ready-to-deploy software packages, (xxvii) automated vulnerability management services (e.g., Amazon Inspector) that scan workloads for software vulnerabilities and/or unintended network exposure, (xxviii) a web application (e.g., AWS Management Console) that comprises and refers to a broad collection of service consoles for managing cloud resources (e.g., AWS resources), (xxix) automation services (e.g., AWS Systems Manager) that facilitate automation of common and repetitive IT operations and management task, (xxx) a managed continuous delivery service (e.g., AWS CodePipeline) that facilitates automated releases of pipelines for fast and reliable application and infrastructure updates, (xxxi) visual workflow services (e.g., AWS Step Functions) that help developers use cloud provider services to build distributed applications, automate processes, orchestrate microservices, and create data and ML pipelines, (xxxii) a serverless event bus (e.g., Amazon EventBridge) that ingests data from the customer's own apps, SaaS apps, and cloud provider services and routes that data to targets, (xxxiii) instance auto scaling services (e.g., Amazon EC2 Auto Scaling) that help customers maintain application availability and facilitate automatic addition and/or removal of instances based on defined scaling policies, (xxxiv) monitoring and management services (e.g., Amazon CloudWatch) that collect and visualize real-time logs, metrics, and event data in automated dashboards to streamline a customer's infrastructure, (xxv) log monitoring services (e.g., Amazon CloudWatch Logs) that facilitate centralized monitoring and analysis of logs from all of a customer's systems, applications, and cloud services they utilize, (xxvi) log search and analysis services (e.g., Amazon CloudWatch Logs Insights) that facilitate interactive search and analysis of a customer's log data that is maintained within a log monitoring service (e.g., Amazon CloudWatch Logs), services (e.g., AWS Batch) that facilitate planning, scheduling, and execution of batch computing workloads across a full range of compute services provided by a cloud provider, and the like. It is to be appreciated the foregoing list of services is representative of only a small subset of services that may be offered by a cloud service provider. Again, while various examples of services are described above with reference to Amazon and/or AWS, it is to be appreciate similar services are available through GCP and/or Azure.

Cloud system 120 may further include one or more processor(s) 124, which may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor(s) 124 may also be implemented as a combination of computing devices, e.g., a combination of a DSP and a microprocessor, a plurality of microprocessors, one or more microprocessors in conjunction with a DSP core, or any other such configuration.

The processor(s) 124 may be connected to memory 126 to execute one or more instructions stored in the memory 124 by the processor(s) 114. The memory 24 may include a cache memory (e.g., a cache memory of a processor of the processor(s) 124), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 126 includes a non-transitory computer-readable medium. The memory 25 may store, or have recorded thereon, instructions. The instructions may include instructions that, when executed by a process of the processor(s) 124, cause the processor to perform the operations described herein with reference to training an anomaly detection engine and/or performing anomaly detection responsive to infrastructure-level events received via the API gateway 122. The machine executable code may be for causing a device to perform these operations, for example by causing one or more processors to control or command the device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

For example, a customer 102a (or 102b-n, but referring to 102a for simplicity herein) may run one or more virtualization layers, such as virtual machines and/or containers on one or more cloud resources 128a-n of cloud system 120, via network 110. A container may use a level of system level virtualization, such as by packaging up application code and its dependencies (e.g., system tools, system libraries and/or settings, etc.) so that a hosted application can be executed reliably on one or more computing platforms of the cloud system 120 (as an example). Some examples of software may include, for example, Red Hat OpenShift, Docker containers, chroot, Linux-VServer, FreeBSD Jails, HP-UX Containers (SRP), VMware ThinApp, etc. Containers may run on the cloud system 120 on a host operating system directly, or may be run via another layer of virtualization (such as within a virtual machine).

In one embodiment, a security service 130 may be offered to customers 102a-n that leverages ML techniques, e.g., an encoder-decoder for sequences of events, to learn an expected behavior and identify anomalous activities. Non-limiting examples anomaly detection training and run-time anomaly detection workflows that may be implemented by the security service 130 are described further below with reference to FIG. 2.

The security service 130 may represent a third-party service or an internal service of the cloud system 120 that is provided to customers 102a-n alone or in addition to other services. For example, customers 102a-n may be provided with an orchestration service (not shown), allowing customers 102a-n to orchestrate one or more containers using the cloud resources 128a-n using an orchestrator (not shown). Orchestration may refer to scheduling containers within a predetermined set of available infrastructure represented by the cloud resources 128a-n. The orchestrator may be used to determine the required infrastructure based upon the needs of containers being executed/requested for execution. For example, orchestrator may map each container to a different set of cloud resources 128a-n, such as by selecting a set of containers to be deployed on each cloud resource 128a-n that is still available for use. Examples of such an orchestrator may include Kubernetes, Docker Swarm, AWS ECS, or the like. Generally, it may refer to a container orchestrator that is executed on a host system of cloud system 120, such as via processor(s) 124 and memory 126, etc., using a host operating system. The orchestrator may further include a scheduler (not shown). The scheduler may be used to make an actual request for infrastructure and allocation of containers to the infrastructure to the cloud system 120. An example of a scheduler may include a Kubernetes scheduler, which may execute on a host within network 110, either on the same hardware resources as the orchestrator or on other hardware and/or software resources.

While in the context of the present example, security service 130 is illustrated as a service running within cloud system 120, it is to be appreciated all or part of the security service 130 may alternatively be physically distinct from the cloud system 120, and may include its own processing and memory components to facilitate operation. For example, security service 130 may be implemented within one or more computer systems external to cloud system 120 that are coupled in communication with cloud system 120 via network 110.

Example API Events

A non-limiting example of API events (e.g., API methods) that may be associated with one or more APIs (e.g., API 125) of a cloud service provider (in this example Amazon), a cloud environment or platform made available by the cloud service provider to its customers, and/or internal services provided to customers by the cloud service provider may include one or more of the following:

"DeleteNetworkInterface"—An Amazon EC2 method that deletes the specified network interface.

"RegisterTaskDefinition"—An Amazon Container Service method that registers a new task definition from the supplied family and containerDefinitions.

"CreateStack"—An AWS CloudFormation method that creates a stack as specified in the template.

"PutRetentionPolicy"—An Amazon CloudWatch Logs method that sets the retention of the specified log group.

"CreateAccessKey"—An AWS IAM method that creates a new AWS secret access key and corresponding AWS access key ID for the specified user.

"StartPipelineExecution"—an AWS CodePipeline method that starts the specified pipeline. Specifically, it begins processing the latest commit to the source location specified as part of the pipeline.

"StartInstances"—An Amazon EC2 method that starts an Amazon EBS-based instance that has previously been stopped.

"ListInstanceProfiles"—An AWS IAM method that lists the instance profiles that have the specified path prefix.

"UpdateProject"—An Amazon CodeBuild or Amazon SageMaker method that changes the settings of a build project or updates a ML project that is created from a template that sets up an ML pipeline from training to deploying an approved model, respectively.

"CreateChangeSet"—An AWS CloudFormation method that creates a list of changes that will be applied to a stack (after they have been reviewed before execution).

"CreateSnapshot"—An Amazon EC2 method that creates a snapshot of an EBS volume and stores it in Amazon S3.

"PutImage"—An Amazon ECR method that creates or updates an image manifest and tags associated with an image.

"PutConfigRule"—An AWS Config method that adds or updates an AWS Config rule to evaluation whether a customer's AWS resource comply with the customer's desired configurations.

"CreateMultipartUpload"—An Amazon S3 method that initiates a multipart upload and returns an upload ID.

"PutRolePolicy"—An AWS IAM method that adds or updates an inline policy document that is embedded in the specified IAM role.

"ListRoles"—An AWS IAM method that lists the IAM roles that have the specified path prefix.

"ListJobs"—An AWS Batch method that returns a list of Batch jobs, for example, in a specified job queue.

"UpdateStack"—An AWS CloudFormation method that updates a stack as specified in the template.

"AssumeRoleWithSAML"—An AWS STS method that returns a set of temporary security credentials for users who have been authenticated via a Security Assertion Markup Language (SAML) authentication response.

"CreateEndpointConfig"—An Amazon SageMaker method that creates an endpoint configuration that SageMaker hosting services use to deploy models.

"StartBuild"—An AWS CodeBuild method that instructs AWS CodeBuild to run the build with the settings in the build project.

"StartAssessmentRun"—An Amazon Inspector method that starts the assessment run specified by the Amazon Resource Name (ARN) of the assessment template.

"AuthorizeSecurityGroupingress"—An AWS method that adds one or more ingress rules to a security group, for example, to permit instances to receive traffic from a specified IPv4 or IPv6 Classless Inter-Domain Routing (CIDR) address range.

"ConsoleLogin"—An AWS Management Console sign-in event.

"PutInventory"—An AWS Systems Manager method that performs a bulk update of custom inventory items on one or more managed nodes.

"UpdatePipeline"—An AWS CodePipeline or SageMaker method that updates a specified pipeline with edits or changes to its structure.

"DeleteModel"—An AWS SageMaker method that deletes a model.

"CreateEndpoint"—An AWS SageMaker method that creates an endpoint using the endpoint configuration specified in the request.

"ModifySecurityGroupRules"—An Amazon EC2 method that modifies the rules of a security group.

"StartExecution"—An AWS Step Functions method that starts execution of a state machine.

"PutRule"—An Amazon EventBridge method that creates or updates the specified rule.

"CreatePolicy"—An AWS IAM method that creates a new managed policy for a customer's AWS account.

"UpdateAutoScalingGroup"—An Amazon EC2 Auto Scaling method that updates the configuration for the specified Auto Scaling group.

"UpdateInstanceAssociationStatus"—An AWS Systems Manager method that updates the status of the AWS Systems Manager document (SSM document) associated with the specified managed node.

"StopQuery"—An Amazon CloudWatch Logs method that stops a CloudWatch Logs Insights query that is in progress.

"StopTask"—An Amazon ECS method that stops a running task.

"DeleteEndpoint"—An Amazon SNS method that deletes a specified endpoint for a device and mobile app from Amazon SNS.

"AssumeRole"—An AWS STS method that returns a set of temporary security credentials that can be used to access AWS resources.

"UpdateFunctionCode20150331v2"—An AWS Lambda event indicative of when a Lambda function was deployed.

"UpdateStateMachine"—An AWS Step Functions method that updates an existing state machine by modifying its definition and/or role ARN.

"PutComplianceItems"—An AWS Systems Manager method that registers a compliance type and other compliance details on a designated resource.

"UpdateSecurityGroupRuleDescriptionsIngress"—An AWS method that updates the description of an ingress (inbound) security group rule.

"CreateRole"—An AWS IAM method that creates a new role for a customer's AWS account.

"RunInstances"—An Amazon EC2 method that launches the specified number of instances using an Amazon Machine Image (AMI) for which the user has permissions.

"CreateNetworkInterface"—An Amazon EC2 method that creates a network interface in the specified subnet.

"StopExecution"—An AWS Step Functions method that stops execution of the specified ARN.

"PutTargets"—An Amazon EventBridge method that adds the specified targets to the specified rule, or updates the targets if they are already associated with the rule.

"UpdateInstanceInformation"—An AWS method that updates the status of the SSM document associated with the specified instance.

"StartQuery"—An Amazon CloudWatch Logs method that schedules a query of a log group using CloudWatch Logs Insights.

"AddUserToGroup"—An AWS IAM method that adds the specified user to the specified group.

"CreateModel"—An Amazon SageMaker method that creates a model in SageMaker.

"CreateAutoScalingGroup"—An Amazon EC2 Auto Scaling method that creates an Auto Scaling group with the specified name and attributes.

"CreateSchedule"—An Amazon EventBridge method that creates the specified schedule.

"CreateArtifact"—An Amazon SageMaker method that creates an artifact. An artifact may represent a lineage tracking entity that represents a Universal Resource Identifier (URI) addressable object or data. Non-limiting examples of artifacts include the S3 URI of a dataset and the ECR registry path of an image.

"ChangePassword"—an AWS IAM method that changes the password of the IAM user making the request.

"AddAssociation"—An Amazon SageMaker method that creates an association between the source and the destination.

"CreateUser"—An AWS IAM method that creates a new IAM user for a particular AWS account.

"DeleteObject"—An Amazon S3 method that removes the null version (if there is one) of an object and inserts a delete marker, which becomes the latest version of the object.

"CreateLaunchConfiguration"—An Amazon EC2 Auto Scaling method that creates a launch configuration "CreateContext"—An Amazon SageMaker method that creates a context (e.g., a lineage tracking entity that represents a logical grouping of other tracking or experiment entities).

"UpdateComputeEnvironment"—An AWS Batch method that updates an AWS Batch compute environment.

"CreateAction"—An Amazon SageMaker method that creates an action. An action may represent a lineage tracking entity that represents an action or activity, for example, a model deployment or a hyperparameter optimization (HPO) tuning job for one or more algorithms.

"DeleteEndpointConfig"—An Amazon SageMaker method that deletes an endpoint configuration of an endpoint (e.g., an inference endpoint).

"AttachUserPolicy"—An AWS IAM method that attaches the specified managed policy to the specified user.

"RegisterContainerInstance"—An Amazon ECS method that registers an EC2 instance into the specified cluster.

"DeleteConfigRule"—An AWS Config method that deletes the specified AWS Config rule and all of its evaluation results.

"SendSSHPublicKey"—An Amazon EC2 Instance Connect method that pushes a Secure Shell (SSH) public key to the specified EC2 instance for use by the specified user.

"UpdateEventSourceMapping20150331"—An AWS Lambda method that updates an event source mapping.

"PutDashboard"—An Amazon CloudWatch method that creates a dashboard if it does not already exist, or updates an existing dashboard.

"CreateCluster"—An Amazon ECS method that creates a new Amazon ECS cluster.

"UpdateElasticsearchDomainConfig"—An AWS method that modifies the cluster configuration of the specified Elasticsearch domain, setting the instance type and the number of instances.

"CreateLogGroup"—An Amazon CloudWatch Logs method that creates a log group with the specified name.

"TestMetricFilter"—An Amazon CloudWatch Logs method that tests the filter patter of a metric filter against a sample of log event messages.

While the foregoing list of API events is representative of those associated with a subset of services offered by Amazon or AWS, it is to be appreciated similar services are available through GCP and/or Azure. As such, embodiments described herein are applicable to API events similar to those listed above that may be associated with analogous services provided by GCP and/or Azure to their respective customers. As will be appreciated by those skilled in the art, the appropriate request syntax and other information relating to a given API method of the foregoing list of API events can be found within the corresponding Amazon API reference. The following API references are hereby incorporated by reference in their entirety for all purposes:

Amazon Elastic Compute Cloud API Reference API Version 2016-11-15 (currently available from https://docs.aws.amazon.com/pdfs/AWSEC2/latest/APIReference/ec2-api.pdf#Welcome);

AWS Identity and Access Management API Reference API Version 2010-05-08 (currently available from https://docs.aws.amazon.com/pdfs/IAM/latest/APIReference/iam-api.pdf#welcome);

Amazon Simple Storage Service API Reference API Version 2006-03-01 (currently available from https://docs.aws.amazon.com/pdfs/AmazonS3/latest/API/s3-api.pdf); and Amazon Security Token Service API Reference API Version 2011-06-16 (currently available from https://docs.aws.amazon.com/pdfs/STS/latest/APIReference/sts-api.pdf#welcome).

Example Workflows

Figure 2:
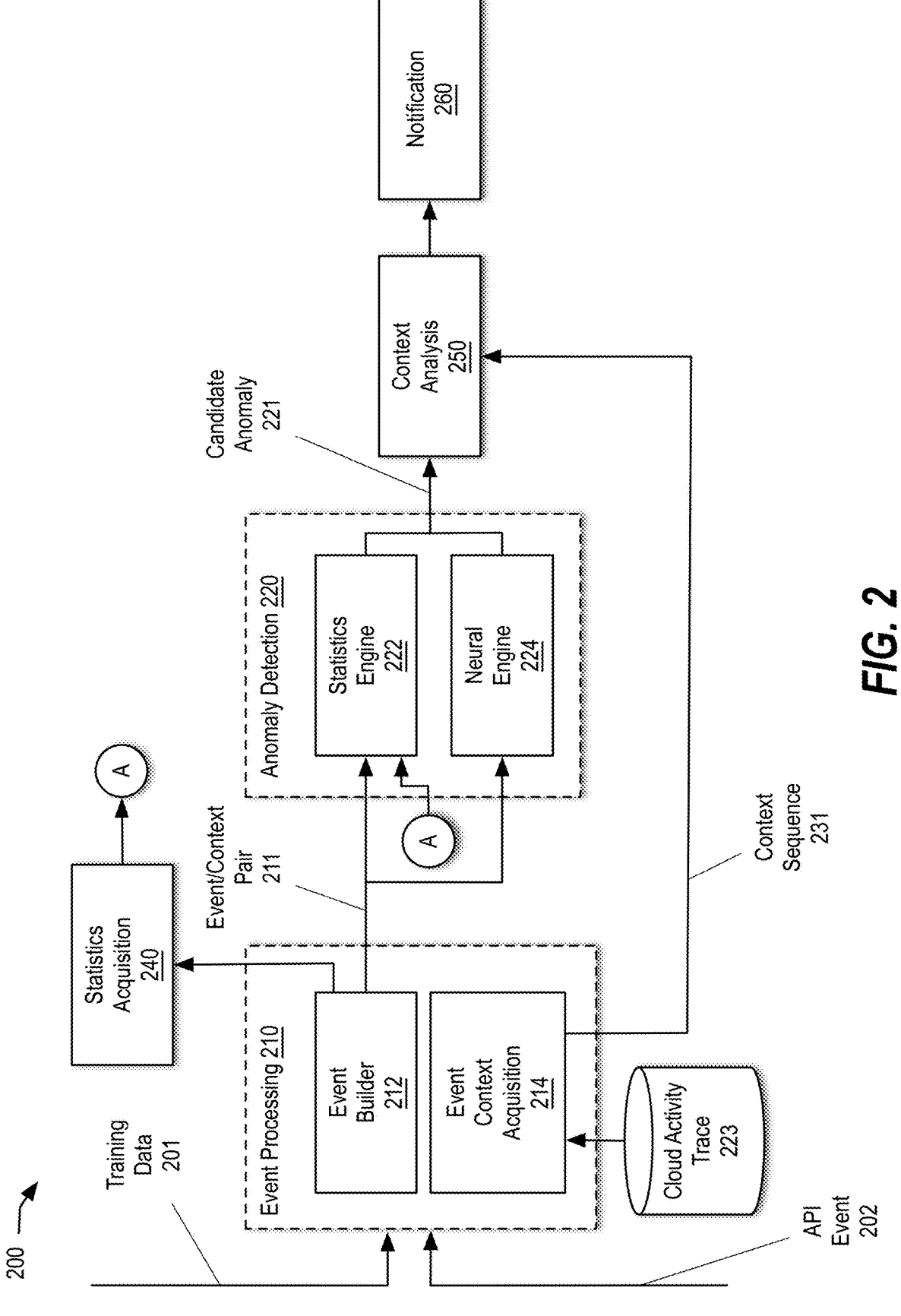
FIG. 2 is a block diagram illustrating example workflows performed by a security service in accordance with various embodiments of the present disclosure.

FIG. 2 is a block diagram illustrating example workflows performed by a security service 200 in accordance with various embodiments of the present disclosure. The security service 200 may be analogous to security service 130 of FIG. 1. In the context of the present example, the workflows (e.g., an anomaly detection training workflow and a run-time anomaly detection workflow) may involve one or more of event processing 210, anomaly detection 220, context analysis 250, and notification 250.

The event processing 210 may be performed by various functional units, components or modules, including an event builder 212 and an event context acquisition module 214. The event builder 212 may be responsible for extracting event/context pairs (e.g., event context pair 211) from training data 201 for input to anomaly detection 220. During the run-time anomaly detection workflow, the event context acquisition module 214 may be responsible for extracting a corresponding immediately preceding context sequence (e.g., context sequence 231) of a predefined or configurable context size (e.g., 10 to 30 events) from a cloud activity trace 223 (analogous to cloud activity trace 123) for a given API event (e.g., API event 202) and making the context sequence available for the context analysis 250.

The anomaly detection 220 may include one or both of a statistics engine 222 and a neural engine 224. The statistics engine 222 may identify a given API event (e.g., API event 202) as a candidate anomaly (e.g., candidate anomaly 221) based on various factors, including historical data (e.g., data extracted from the cloud activity trace 223) and community data. For example, the statistics engine 222 may flag a given API event as a candidate anomaly when the given API event has not been observed over a given period of time (e.g., the past 90 days), has not been previously received from a given user or role, and/or is otherwise statistically abnormal as compared to a community of users that make use of the security service 130.

As part of the anomaly detection training workflow, an ML model (not shown) of the neural engine 224 that is capable of performing a self-supervised learning approach may be trained. According to one embodiment the ML model is an encoder-decoder ML model. Training data 201, for example, generated based on event data extracted from the cloud activity trace 223 for a particular data range may be split into event/context pairs (e.g., event/context pair 211)

for input to the anomaly detection 220 to train the encoder-decoder ML model to predict events based on the predefined or configurable context size of the immediately preceding context sequences. A non-limiting example of encoder-decoder ML model training is described further below with reference to FIG. 4.

Depending upon the particular implementation, during the run-time anomaly detection workflow, the statistics engine 222 and/or the neural engine 224 may be used alone or in combination to identify the API event 202 as a candidate anomaly 221, which may be further evaluated by the context analysis 250. As described further below with reference to FIG. 5, the neural engine 224 may be responsible for identifying a given API event as a candidate anomaly based on a comparison between the given API event and a predicted event by the encoder-decoder ML model of the neural engine 224. Responsive to identification of a candidate anomaly, content analysis 250 may be performed to filter the candidate anomalies for which notification 260 (e.g., alerting or otherwise informing the customer) is to be performed. For example, performance of notification 260 may be limited to those candidate anomalies confirmed to be actual anomalies or determined to be events/actions of high impact (e.g., those that might result in data loss, security issues, or something from which recovery would be difficult or impossible). A non-limiting example of context analysis 250 is described below with reference to FIG. 6.

Example Process Flow

Figure 3:
FIG. 3 illustrates an example process flow for anomaly detection training and run-time anomaly detection in accordance with various embodiments of the present disclosure.

FIG. 3 illustrates an example process flow 300 for anomaly detection training and run-time anomaly detection in accordance with various embodiments of the present disclosure. In the context of the present example, various interactions among a customer 302 (e.g., one or customers 102a-n), a security service 330 (which may be analogous to security service 130), and a cloud provider 320 (which may offer access to cloud system 120) are shown.

In one embodiment, the customer 302 may trigger training initiation 301 to cause the security service 330 to start the process of training a neural network ML model (e.g., an encoder-decoder ML model). The training initiation request may include various parameters specifying the nature of the anomaly detection training to be performed. For example, the training initiation request may include a date range defining the range of events stored within a cloud activity trace (e.g., cloud activity trace 123) to be used for training. Depending upon the particular implementation, the training initiation request may also include information indicative of the level at which training is to be performed. For example, the encoder-decoder ML model may be trained at the organization level (e.g., based on all events within the date range), at a lower level (e.g., for one or more selected sub-accounts associated with the organization, for one or more selected users within the organization, and/or for one or more selected roles within the organization), or both. Responsive to the training initiation 301, the security service 330 may obtain event information 304 from the cloud provider 320 for the defined data range by issuing a cloud activity trace query 303 to the cloud provider 320 specifying the date range. Responsive to receipt of the event information 304 from the cloud provider 320, the security service may perform anomaly detection training 340 to train the encoder-decoder ML model.

When the anomaly detection training is complete, the security service 330 may inform the customer via a training complete 305 indication. Thereafter, any subsequent cloud API calls (e.g., cloud API call 306) originated by the customer or subsequent internal cloud API calls (e.g., internal cloud API call 307), for example, originated by automated means may be subject to run-time anomaly detection processing. Referring back to FIG. 1, an example of cloud API call 306 is a call received by API 125 from API gateway 122 responsive to receipt of a customer request by API gateway 122. The security service 330 may be notified of the cloud API call 306 by the cloud provider 330 via an API event notification 308. Depending upon the particular implementation, the API event notification 308 may represent (i) a notification from API gateway 122 responsive to receive of the cloud API call 306 or the internal cloud API call 307 or (ii) an affirmative response to polling by the security service 330 regarding the existence of a new event within the cloud activity trace.

At this point, a second cloud activity trace query (e.g., query cloud activity trace 309) may be performed by the security service to retrieve a specified number of contextual events 310 from the cloud activity trace. The specified number of contextual events 310 should correspond to the predefined or configurable context size (e.g., 20) previously used to train the encoder-decoder ML model.

Responsive to receipt of the contextual events 310 from the cloud activity trace, the security service 330 may perform run-time anomaly detection 350, for example, by requesting the encoder-decoder ML model to predict an event based on the contextual events 310. Based on the results of the run-time anomaly detection, a conditional anomaly notification 311 may be provided to the customer 302. For example, a candidate anomaly may be identified when the predicted event does not match the API call at issue (e.g., the cloud API call 306 or the internal cloud API call 307 that triggered the run-time anomaly detection processing). As described further herein, the context of the candidate anomaly may be further evaluated to confirm the anomaly as a precondition to issuance of an anomaly notification to the customer 302.

Example Encoder-Decoder ML Model Training

Figure 4:
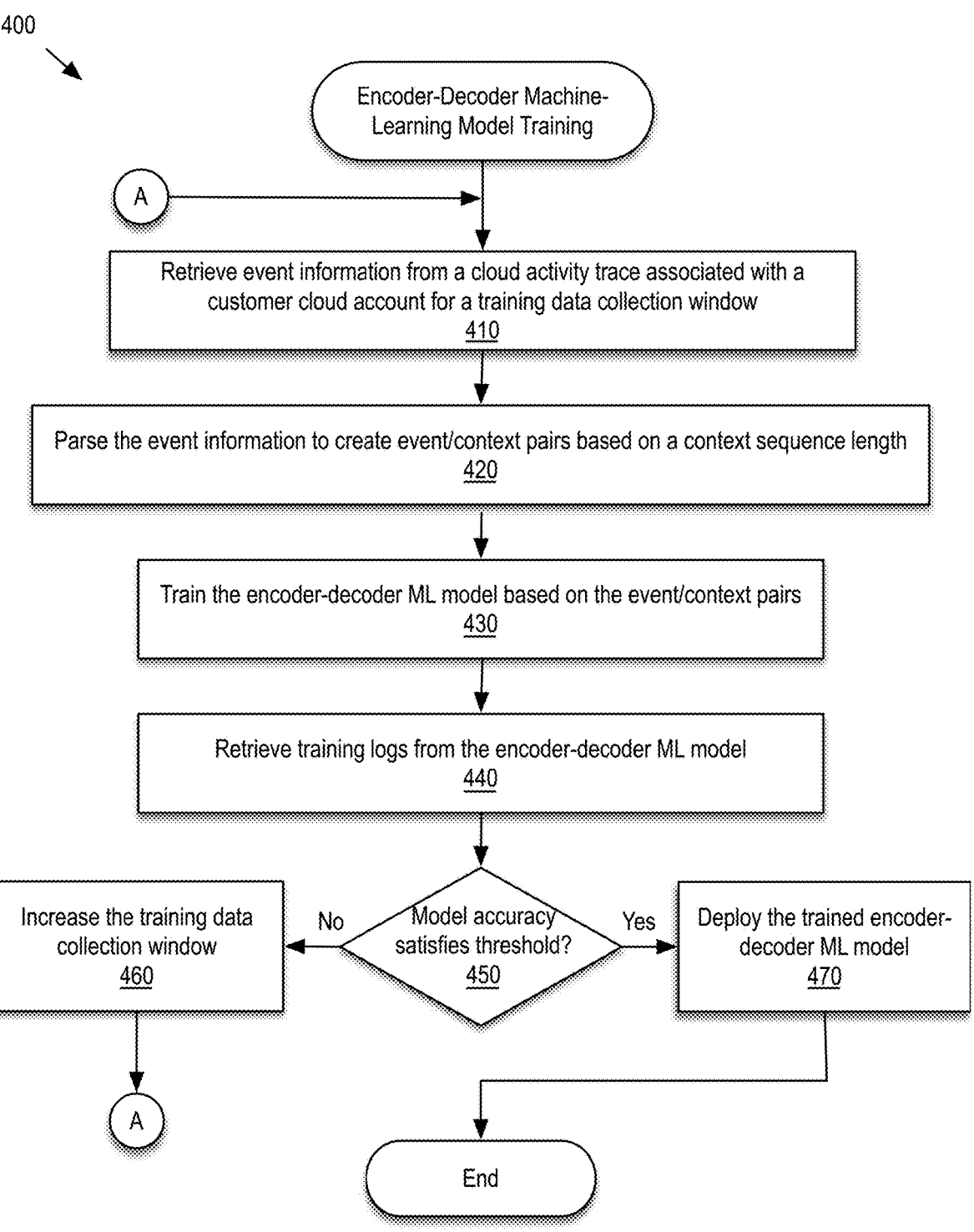
FIG. 4 is a flow diagram illustrating a set of operations for training an encoder-decoder machine-learning (ML) model in accordance with an embodiment of the present disclosure.

FIG. 4 is a flow diagram illustrating a set of operations for training an encoder-decoder machine-learning (ML) model in accordance with an embodiment of the present disclosure. The anomaly detection training described with reference to FIG. 4 may be performed by a security service (e.g., security service 130) running within a cloud system (e.g., cloud system 120). In one embodiment, a deep learning anomaly detection ML model for detecting anomalous events is implemented based on a sequential autoencoder-decoder architecture in which the encoder-decoder ML model is trained to reconstruct the input data. For example, an encoder component of the encoder-decoder ML model compresses the input (to produce a compressed representation of the normal event sequences (referred to herein as context)) into a lower-dimensional representation, also known as the "latent space," and then a decoder component of the encoder-decoder ML model is trained to reconstruct or predict the next event (given the context) from the compressed representation of the corresponding input sequence.

At block 410, event information is retrieved. For example, responsive to initiation of a training workflow by a customer (e.g., one of customers 102*a-n*) for a particular training data collection window (e.g., a date range), a security service (e.g., security service 130) may retrieve historical events from a cloud activity trace (e.g., cloud activity trace 123) associated with the customer for the training data collection window. Alternatively, the training workflow may be triggered upon startup of the security service based on a default training data collection window (e.g., the prior 30 to 90 days) or the availability of a threshold number of historical events (e.g., 1M, 10M, 50M).

At block 420, the event information is parsed to create event/context pairs (collectively, representing training data) based on a predetermined or configurable context sequence length. The context size as well as other hyperparameters for the ML model should be selected to maximize prediction accuracy for the top-K next event. Empirical evidence suggests a context size of approximately 20 events provides an accuracy of 96% for the top-10 next event.

At block 430, the encoder-decoder ML model is trained based on the event/context pairs generated in block 420 by inputting the event/context pairs, one at a time to the encoder-decoder ML model. For example, While it is to be appreciated much more training data (e.g., millions of events) should be used for purposes of achieving a practical level of prediction accuracy, for purposes of illustration, Table 1 (below) illustrates the first 10 example event/context pairs and the last event/context pair for a given set of historical event information including 100,000 events and based on a context size of 5.

TABLE 1

| Examples of event/context pairs based on a context size of 5 and historical event information containing a sequence of 100,000 events (i.e., $E_1$ to $E_{100000}$) | |
| --- | --- |
| Event Data | $E_1, E_2, E_3, E_4, E_5, E_6, E_7, E_8, E_9, E_{10}, E_{11}, E_{12}, E_{13}, E_{14}, \ldots E_{1000000}$ |
| Event/Context Pair #1 | $E_6/<E_1, E_2, E_3, E_4, E_5>$ |
| Event/Context Pair #2 | $E_7/<E_2, E_3, E_4, E_5, E_6>$ |
| Event/Context Pair #3 | $E_8/<E_3, E_4, E_5, E_6, E_7>$ |
| Event/Context Pair #4 | $E_9/<E_4, E_5, E_6, E_7, E_8>$ |
| Event/Context Pair #5 | $E_{10}/<E_5, E_6, E_7, E_8, E_9>$ |
| Event/Context Pair #6 | $E_{11}/<E_6, E_7, E_8, E_9, E_{10}>$ |
| Event/Context Pair #7 | $E_{12}/<E_7, E_8, E_9, E_{10}, E_{11}>$ |
| Event/Context Pair #8 | $E_{13}/<E_8, E_9, E_{10}, E_{11}, E_{12}>$ |
| Event/Context Pair #9 | $E_{14}/<E_9, E_{10}, E_{11}, E_{12}, E_{13}>$ |
| Event/Context Pair #10 | $E_{15}/<E_{10}, E_{11}, E_{12}, E_{13}, E_{14}>$ |
| . . . | . . . |
| Event/Context Pair #99995 | $E_{100000}/<E_{99995}, E_{99996}, E_{99997}, E_{99998}, E_{99999}>$ |

Given the historical event data of Table 1, training data in the form of 99,995 event/context pairs may be generated in block 420 by spitting the event data into a collection of event sequences of context size+1 (6 in this example) in which the first context size (5 in this example) events of a given event sequence of the collection represents the context portion of the event/context pair and the last event context of the given event sequence represents the event portion of the event/context pair. For example, event context pair #1 is $E_6/<E_1, E_2, E_3, E_4, E_5>$ since $E_6$ is preceded by the context sequence of size $5<E_1, E_2, E_3, E_4, E_5>$. Continuing with the example, event context pair #2 is $E_7/<E_2, E_3, E_4, E_5, E_6>$ since $E_7$ is preceded by the context sequence of size $5<E_2, E_3, E_4, E_5, E_6>$. Similarly, event context pair #3 is $E_8/<E_3, E_4, E_5, E_6, E_7>$ since $E_7$ is preceded by the context sequence of size $5<E_3, E_4, E_5, E_6, E_7>$ and so on. Those skilled in the art will appreciate the event data should be split differently based on the desired context size to create appropriate training data for the ML model. For example, if the desired context size for the collection of event sequences is 10, event context pair #1 of Table 1 would instead be represented as $E_{11}/<E_1, E_2, E_3, E_4, E_5, \ldots, E_{10}>$. Similarly, if the desired context size for the collection of event sequences were 15, event context pair #1 of Table 1 would instead be represented as $E_{16}/<E_1, E_2, E_3, E_4, E_5, \ldots, E_{15}>$.

In embodiments described herein, event/context pairs (such as those listed in Table 1) may be provided in block 430 as a training input to a deep learning anomaly detection ML model (e.g., an encoder-decoder ML model) to allow the ML model to learn one or more particular contexts that lead to a particular event. For example, should the sequence of events $<E_1, E_2, E_3, E_4, E_5, E_6>$ be repeated frequently enough in the event information extracted from the cloud activity trace, the ML model will learn with a particular degree of confidence that a context of $<E_1, E_2, E_3, E_4, E_5>$ leads to an event $E_6$.

At block 440, training logs may be retrieved from the encoder-decoder ML model.

At decision block 450, a determination is made regarding whether the model accuracy from the training logs satisfies a threshold accuracy (e.g., in the range of 90% to 98%). If so, processing continues with block 470; otherwise, processing branches to block 460.

At block 470, the process of training the encoder-decoder of the encoder-decoder ML mode is complete and the trained encoder-decoder ML model may be deployed for use during run-time anomaly detection an example of which is shown and described in connection with FIG. 5.

At block 460, the training data collection window may be increased and processing may start over at block 410. In one embodiment, the training data collection window may be increased by a predetermined or configurable time frame (e.g., number of days, weeks, or months.

In one embodiment, the processing described above may be performed using an event-driven, serverless computing platform (e.g., AWS Lambda) provided by the cloud provider. For example, during the training phase, responsive to receipt of event data from the cloud activity trace, a step function may coordinate multiple Lambda functions to parse event information into training data and to submit batches of the training data to the encoder-decoder ML model.

According to one embodiment, a continuous learning mechanism may be implemented in the encoder-decoder ML model that allows the encoder-decoder ML mode to adapt to new patterns and threats as they arise and prevents model decay. As the encoder-decoder ML model is continuously exposed to new events from cloud activity trace(s), the encoder-decoder ML model updates its understanding of normal behaviors and can detect new anomalies. For example, the ML model trained at time A may be saved instead of retraining from scratch by loading the ML model trained at time A into memory and then using new data available as of time B to update the ML model.

Example Run-Time Anomaly Detection

FIG. 5 is a flow diagram illustrating a set of operations for performing run-time anomaly detection in accordance with an embodiment of the present disclosure. As above, the run-time anomaly detection described with reference to FIG. 5 may be performed by a security service (e.g., security service 130) running within a cloud system (e.g., cloud system 120) or running within a computer system external to the cloud system but coupled in communication with the cloud system.

At block 510, information regarding an API event is received. The information may be received as a result of the security service polling a cloud activity trace (e.g., cloud activity trace 123) or as a result of an API gateway (e.g., API gateway 122) notifying the security service upon receipt of a call to an API (e.g., API 125).

At block 520, the context for the API event is determined. For example, the sequence of N events immediately preceding the API event may be retrieved from the cloud activity trace, where N represents the predetermined or configurable context size used to train the encoder-decoder ML model during the training phase.

At block 530, based on the context sequence determined at block 520, a predicted event may be obtained from the trained encoder-decoder ML model. For example, based on previous training, for example, as described with reference to FIG. 4, the encoder-decoder ML model may be requested to output a predicted event for the context sequence. In this manner, a deep learning anomaly detection ML model analyzes new events and identifies any patterns that deviate from normal behavior that was learned during the training phase. In one embodiment, the encoder-decoder ML model may also be requested to output weights associated with each individual event of the context sequence to allow a determination to be made regarding the respective contribution of the events in the context sequence to the anomaly detection.

At decision block 540, it is determined whether the predicted event at block 530 matches the API event at issue for which information was received at block 510. If so, then the API event is not anomalous and run-time anomaly detection is complete. If not, then run-time anomaly detection processing continues with block 550.

At block 550, the API event is identified or otherwise flagged as a candidate anomaly.

At block 560, context analysis is performed to confirm whether the candidate anomaly is indeed an anomaly. For example, the context sequence associated with a given candidate anomaly and/or the given candidate anomaly may be evaluated to determine whether it falls into a critical operations category (e.g., an operation that raises a security concern), modifies certain metadata (e.g., account, resources, cloud provider, Internet Protocol (IP) addresses), and/or satisfies certain time-related criteria (e.g., day of the week, hour of the day, etc.). A non-limiting example of context analysis processing is described further below with reference to FIG. 6.

At decision block 570, it is determined whether the candidate anomaly was confirmed by the context analysis to be an anomaly. If so, processing continues with block 580; otherwise, run-time anomaly detection processing is complete.

At block 580, customer notification processing may be performed. For example, an administrative user (e.g., a security analyst) of the customer may be notified the API event at issue is anomalous based on the context sequence. The customer may also be informed regarding the top events of the context sequence that contributed to the anomaly detection based on the weighting information received in block 530.

In one embodiment, initially, any non-predicted event can be flagged, and a notification or alert may be issued (subject to various forms of filtering). However, the system can be trained to identify and/or contrast between anomalous events of security concern and anomalous events of mere performance concern. For example, a system of weighting can be employed. This learning can be facilitated by a feedback loop. That is, alerts can be sent to an administrating entity, feedback from the administrating entity can be input to a performance monitoring component, and in view of the performance monitoring, a decision can be made by the system to fine tune and/or retrain the model. One or more thresholds (e.g., quantity, time-based, etc.) can be employed for such determination. Training can also be conducted at a selected frequency and/or upon request.

Example Context Analysis

Figure 6:
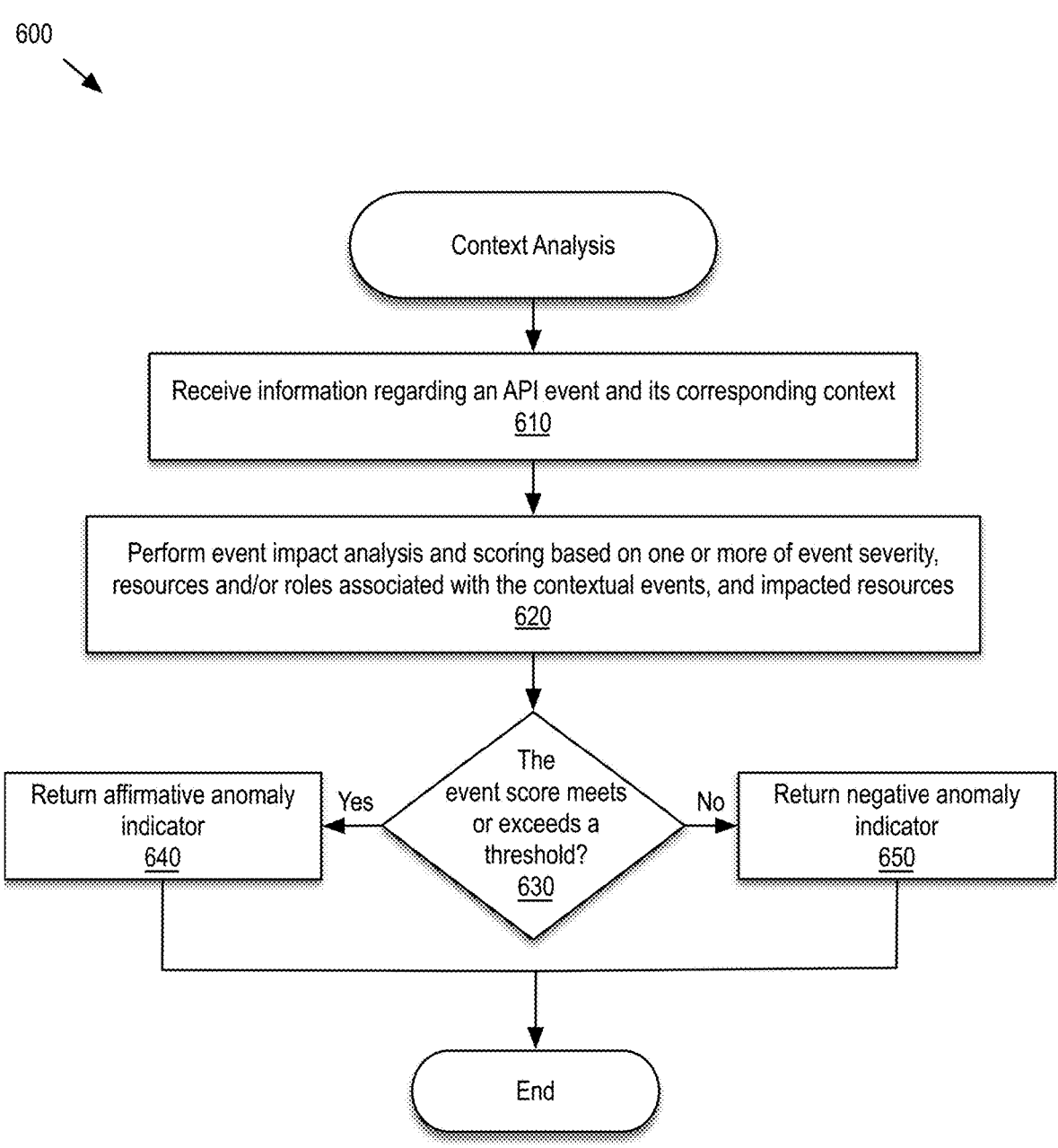
FIG. 6 is a flow diagram illustrating a set of operations for performing context analysis of a candidate anomaly in accordance with an embodiment of the present disclosure.

FIG. 6 is a flow diagram illustrating a set of operations for performing context analysis of a candidate anomaly in accordance with an embodiment of the present disclosure. The context analysis described with reference to FIG. 6 may be performed by a security service (e.g., security service 130) running within a cloud system (e.g., cloud system 120) or running within a computer system external to the cloud system but coupled in communication with the cloud system. Given the deep learning anomaly detection ML model implemented within the neural engine (e.g., neural engine 224) is not expected to operate at 100% accuracy, it is inevitable that anomalies perceived by the neural engine (e.g., the candidate anomalies representing a mismatch between the actual observed event and the next predicted event based on the context) and output by the anomaly detection module (e.g., anomaly detection 220) will be overinclusive. For example, empirical data suggests over 100 alerts/notifications per day may result in the absence of post-processing of the output of the anomaly detection module. In order to reduce the number of alerts/notifications, for example, to on the order of about 5 per day, candidate anomalies may be filtered as described herein.

At block 610, information regarding the API event at issue (e.g., candidate anomaly 221) and its corresponding context (e.g., context sequence 231) is received, for example, by context analysis 250.

At block 620, an event impact analysis and scoring may be performed. In one embodiment, the event impact analysis and scoring is based on one or more of event severity, resources and/or roles associated with the contextual events, and impacted resources. Event severity may be determined based on whether the candidate anomaly falls into a critical operations category, modifies certain metadata (e.g., account, resources, cloud provider, Internet Protocol (IP) addresses), and/or satisfies certain time-related criteria (e.g., day of the week, hour of the day, etc.). In one embodiment, resources may be labeled in accordance with their respective criticality to facilitate impact analysis on resources. Based on the foregoing, an event score may be generated.

The following scenarios illustrate aspects of the scoring algorithm in accordance with an embodiment:

Scenario #1: An event is detected that indicates an EC2 (1) is unexpectedly accessed from an IP (2) that is known to be associated with malicious activity. The EC2 is associated with a role (3) that has full permission to access S3.

Scenario #2: An event is detected that indicates an EC2 (1) is unexpectedly accessed from an IP (2) that is known to be associated with malicious activity. The EC2 is not associated any roles.

In one embodiment, the scoring algorithm may give different weights to factors (1), (2), and (3) above to give scenario #1 a higher risk score than that of scenario #2.

At decision block 630, it is determined whether the event score (which may also be referred to as an impact score) determined in block 620 meets or exceeds a threshold (e.g., an impact score threshold). If so, an affirmative anomaly indicator may be returned or set at block 640; otherwise, a negative anomaly indicator may be returned or set at block 650.

Referring back to the examples of API events described earlier, non-limiting examples of events/actions of "high impact" may include one or more of the following:

"RunInstances"—This event may have an impact score meeting or exceeding the impact score threshold as a result of its potential for starting one or more expensive Graphics Processing Unit (GPU) instances, which may in turn lead to financial losses.

"CreateUser"—This event may have an impact score meeting or exceeding the impact score threshold as a result of its potential to create a user for lateral movement within the cloud environment.

"DeleteObject"—This event may have an impact score meeting or exceeding the impact score threshold as a result of it potential to delete certain S3 objects, which may lead to data loss.

"AssumeRole"—This event may have an impact score meeting or exceeding the impact score threshold as a result of it potential to lead to privilege escalation.

Depending upon the particular implementation, responsive to confirming the candidate anomaly as an anomaly, threat analysis may also be performed. For example, information relating to all events from a given session relating to the anomaly may be gathered and submitted to a threat analysis process (e.g., a MITRE threat analysis process based on the MITRE ATT&CK framework and/or various MITRE ATT&ACK techniques) to provide the customer with an appropriate threat notification should the anomaly also be determined to represent a threat. A non-limiting example of threat analysis processing is described further below with reference to FIG. 7.

Example Threat Analysis

Figure 7:
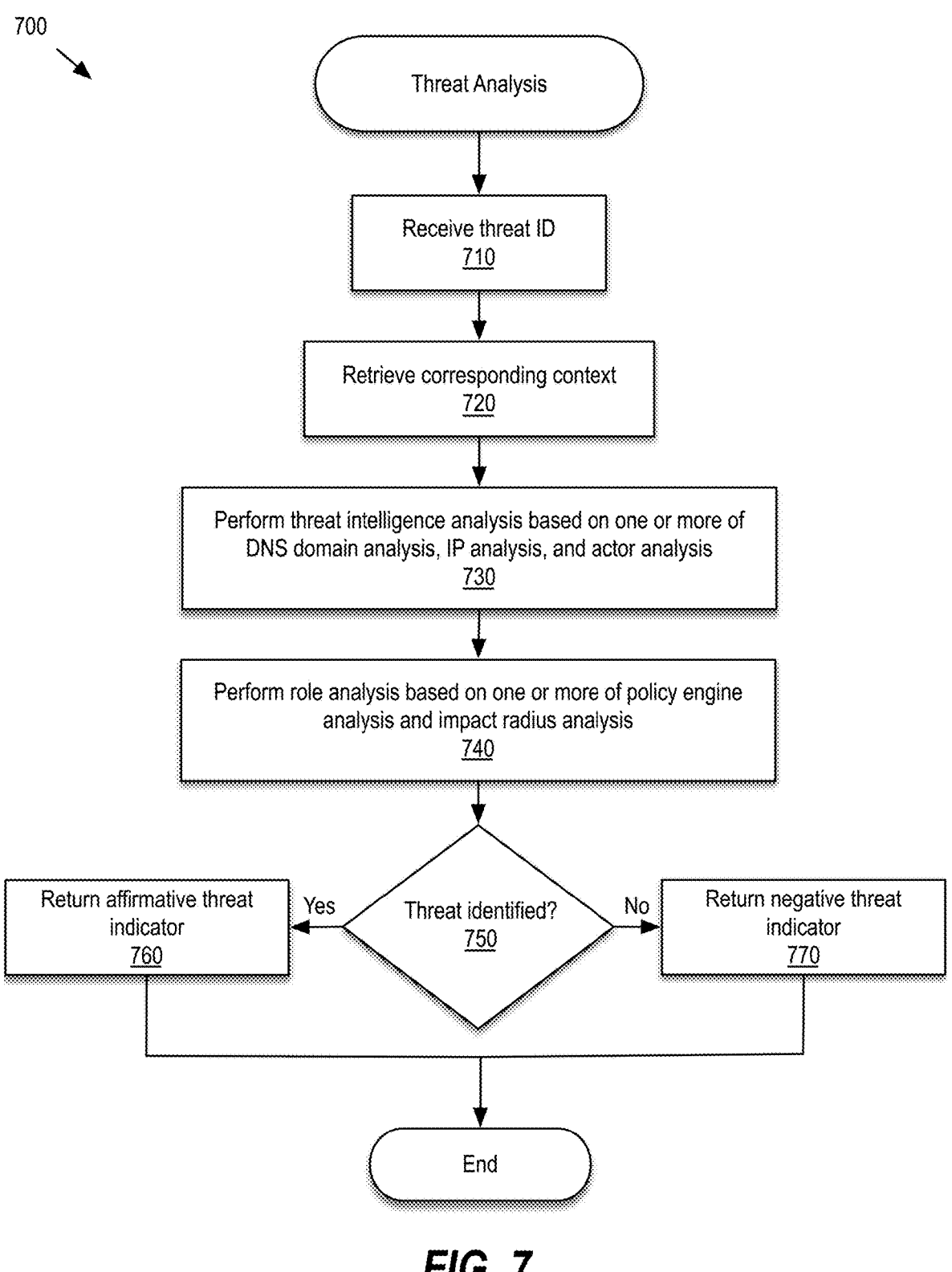
FIG. 7 is a flow diagram illustrating a set of operations for performing threat analysis in accordance with an embodiment of the present disclosure.

FIG. 7 is a flow diagram illustrating a set of operations for performing threat analysis in accordance with an embodiment of the present disclosure. The threat analysis described with reference to FIG. 7 may be performed by a security service (e.g., security service 130) running within a cloud system (e.g., cloud system 120) or running within a computer system external to the cloud system but coupled in communication with the cloud system. According to one embodiment, the threat analysis of FIG. 7 may be performed after confirming a particular candidate anomaly represents an anomalous activity.

At block 710, a threat ID is received. The treat ID may correspond to a particular API event and may have been associated with the particular API event, for example, as a result of the particular API event having been confirmed as an anomalous activity by context analysis (e.g., the context analysis described above with reference to FIG. 6).

At block 720, the corresponding context for the particular API event is retrieved, for example, directly or indirectly from a cloud activity trace (e.g., cloud activity trace 233) or from an object storage service to which the cloud activity trace is persisted. In one embodiment, the corresponding context for the particular API event is not limited to a predetermined number of events (e.g., context sequence 231) preceding the event at issue, but rather includes information regarding all events from the session that relate to the anomalous activity.

At block 730, threat intelligence analysis is performed. In one embodiment, the threat intelligence analysis is based on one or more of DNS domain analysis, IP analysis, and actor analysis. DNS domain analysis may perform a check to determine wither a specific DNS name is not machine generated (hence very likely a malicious one). IP analysis may perform a check regarding the history of an IP address to understand whether it has been involved with malicious activities. Actor analysis may perform a check regarding whether the user associated with an anomalous event would normally take such action. For example, assume a particular user is assigned to a web service application, it would not be expected for this particular user to list S3 buckets.

At block 740, role analysis is performed. In one embodiment, the role analysis is based on one or more of policy engine analysis and impact radius analysis. The policy engine analysis may involve retrieval of information from a policy database indicate of resources accessible per role. The impact radius analysis may involve correlation of infrastructure data from an infrastructure database with vulnerability data from a vulnerability database. The infrastructure database may be a graph database. The infrastructure database may build a graph representation of an infrastructure, for example, given an EC2 instance, the associated roles of the EC2 instance, and the security group of the EC2 instance. Then, the resources accessible via this security group may be determined. The vulnerability database may contain information regarding vulnerabilities detected from resources, for example, whether a given EC2 contains a vulnerability that allows an attacker to gain access remotely. Assuming the given EC2 has direct access to a database, the impact radius then includes the EC2 instance (radius 1) as well as the database to which the given EC2 instance connects (radius 2).

At decision block 750, it is determined whether the particular API event at issue represents a threat based on the threat intelligence analysis and the role analysis of blocks 730 and 740, respectively. If so, an affirmative threat indicator may be returned or set at block 760; otherwise, a negative threat indicator may be returned or set at block 770. If a threat has been identified, a notification may be presented to an administrative user (e.g., a security analyst) of the customer, for example, via a presentation module associated with the security service.

While in the context of various examples (e.g., the flow diagrams of FIGS. 5-8), a number of enumerated blocks are included, it is to be understood that other examples may include additional blocks before, after, and/or in between the enumerated blocks. Similarly, in some examples, one or more of the enumerated blocks may be omitted and/or performed in a different order.

Example Predictions

Figures 8A, 8B:
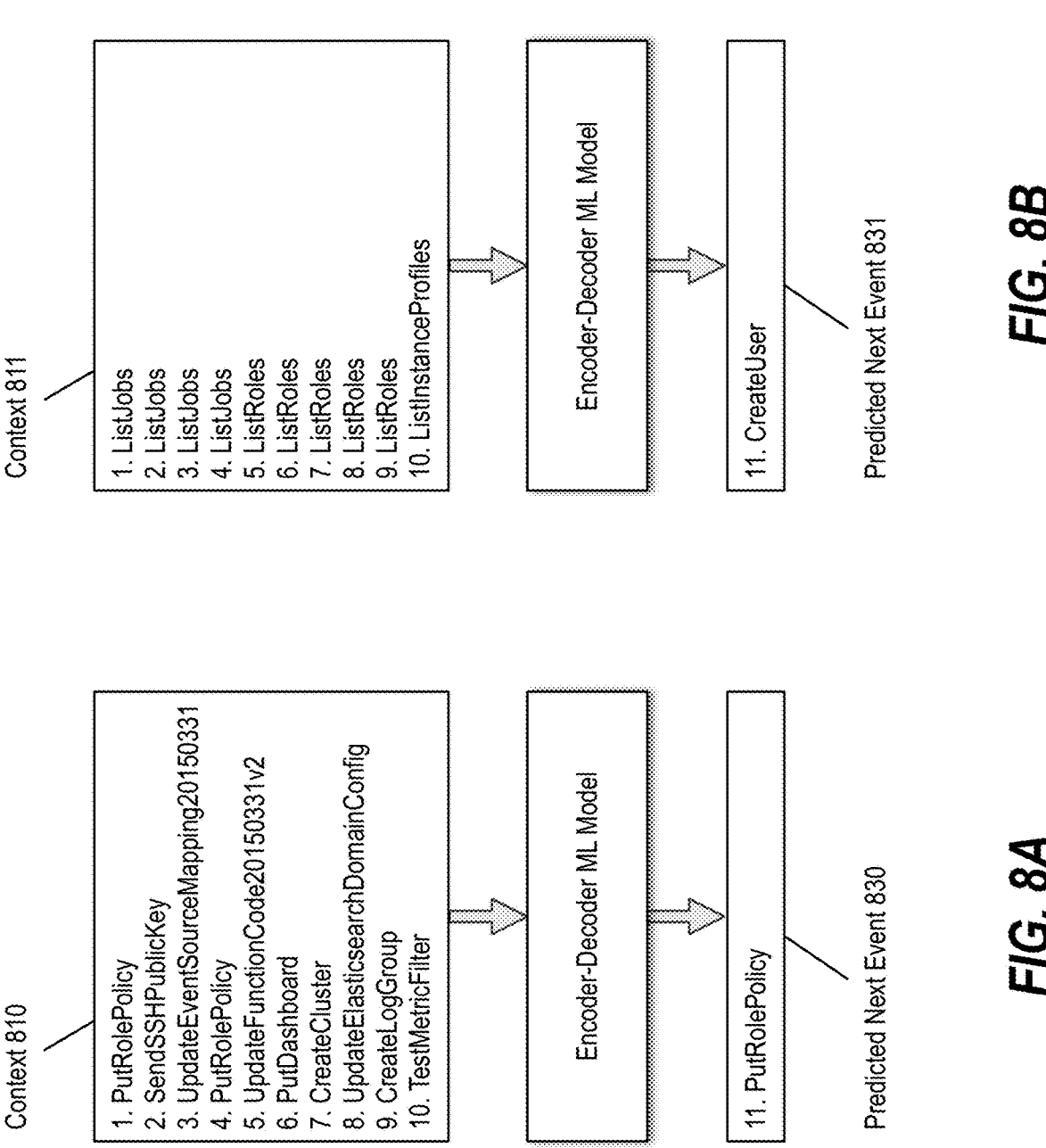
FIGS. 8A-B are block diagrams illustrating examples of predicted next events in accordance with an embodiment of the present disclosure.

FIGS. 8A-B are block diagrams illustrating examples of predicted next events in accordance with an embodiment of the present disclosure. FIG. 8A shows one example of a prediction of a next event (e.g., predicted next event 830) by a trained sequential encoder-decoder ML model based on a context 810 including a sequence of 10 immediately preceding events. In this example, based on the context 810, the encoder-decoder ML model has predicted the next API event (e.g., predicted next event 830) will be a "PutRolePolicy" API call. To the extent the next observed API event, is other than a "PutRolePolicy" API call, the next observed API event may be flagged as a candidate anomaly for further evaluation prior to generating a notification or alert to an administrative user. In this example, the ML model correctly expects the log to be secured before any activity monitoring activities are performed.

FIG. 8B shows another example of a prediction of a next event (e.g., predicted next event 831) by a trained sequential encoder-decoder ML model based on a context 811 including a sequence of 10 immediately preceding events. In this example, based on the context 811, the encoder-decoder ML model has predicted the next API event (e.g., predicted next event 831) will be a "CreateUser" API call. To the extent the next observed API event, is other than a "CreateUser" API call, the next observed API event may be flagged as a candidate anomaly for further evaluation prior to generating a notification or alert to an administrative user. This example is of interest as despite the majority of events in the context

811 having no relationship to user creation, the ML model has predicted user creation as the next event.

Embodiments of the present disclosure include various steps, which have been described above. The steps may be performed by hardware components or may be embodied in machine-executable instructions, which may be used to cause a processing resource (e.g., a general-purpose or special-purpose processor) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

All examples and illustrative references are non-limiting and should not be used to limit the applicability of the proposed approach to specific implementations and examples described herein and their equivalents. For simplicity, reference numbers may be repeated between various examples. This repetition is for clarity only and does not dictate a relationship between the respective examples. Finally, in view of this disclosure, particular features described in relation to one aspect or example may be applied to other disclosed aspects or examples of the disclosure, even though not specifically shown in the drawings or described in the text.

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A non-transitory machine readable medium storing instructions, which when executed by one or more processors of one or more computer systems, cause the one or more computer systems to:

observe an actual API event associated with infrastructure utilized by a particular customer immediately following a set of contextual events representing a sequence of API events relating to the infrastructure that have been logged by a cloud environment providing the infrastructure to a cloud activity trace, wherein the infrastructure is accessible via an application programming interface (API) exposed by the cloud environment;

receive, from a sequential encoder-decoder machine-learning (ML) model, a prediction regarding an API event that is expected to follow the set of contextual events, wherein the sequential encoder-decoder ML model was trained based on historical events associated with the infrastructure;

determine whether the predicted API event differs from the actual API event;

after a determination that the predicted API event differs from the actual API event, flag the actual API event as a candidate anomaly for further evaluation;

determine an impact score of the candidate anomaly based on one or more of a severity of the candidate anomaly, a user role associated with the set of contextual events, and one or more resources of the infrastructure affected by the candidate anomaly; and conditionally notify an administrative user of the particular customer regarding anomalous activity associated with the infrastructure based on the determined impact score.

2. The non-transitory machine readable medium of claim 1, wherein the cloud activity trace includes information regarding activity of users associated with the particular customer and usage of the API.

3. The non-transitory machine readable medium of claim 1, wherein conditional notification of the administrative user involves issuance of an anomaly notification to the administrative user responsive to the candidate anomaly being something from which recovery would be difficult or impossible.

4. The non-transitory machine readable medium of claim 1, wherein the severity of the candidate anomaly is based on one or more of whether the candidate anomaly falls into a critical operations category, whether the candidate anomaly modifies particular metadata, and whether the candidate anomaly satisfies certain time-related criteria.

5. The non-transitory machine readable medium of claim 1, wherein the severity of the candidate anomaly is based on whether the candidate anomaly modifies particular metadata that includes one or more of account information, resource information, cloud provider metadata, and an Internet Protocol (IP) address.

6. The non-transitory machine readable medium of claim 1, wherein the one or more resources are labelled in accordance with their respective criticality to facilitate determination of the impact score.

7. A method comprising:

training an encoder-decoder machine-learning (ML) model based on historical events associated with infrastructure utilized by a particular customer, wherein the infrastructure is accessible to the particular customer infrastructure is accessible to the particular customer via an application programming interface (API) exposed by a cloud environment providing the infrastructure;

monitoring a cloud activity trace to which the cloud environment logs API events relating to the infrastructure;

observing an actual API event associated with the infrastructure immediately following a set of contextual events representing a sequence of a predetermined or configurable number of API events relating to the infrastructure logged by the cloud environment to the cloud activity trace;

causing the trained encoder-decoder ML model to make a prediction regarding an API event that is expected to follow the set of contextual events;

determining whether the predicted API event differs from the actual API event;

after a determination that the predicted API event differs from the actual API event, flagging the actual API event as a candidate anomaly for further evaluation;

determining an impact score of the candidate anomaly based on one or more of a severity of the candidate anomaly, a user role associated with the set of contextual events, and one or more resources of the infrastructure affected by the candidate anomaly; and conditionally notifying an administrative user of the particular customer regarding anomalous activity associated with the infrastructure based on the determined impact score.

8. The method of claim 7, wherein the cloud activity trace includes information regarding activity of users associated with the particular customer and usage of the API.

9. The method of claim 7, wherein said conditionally notifying involves issuance of an anomaly notification to the administrative user responsive to the candidate anomaly being something from which recovery would be difficult or impossible.

10. The method of claim 7, wherein the severity of the candidate anomaly is based on one or more of whether the candidate anomaly falls into a critical operations category, whether the candidate anomaly modifies particular metadata, and whether the candidate anomaly satisfies certain time-related criteria.

11. The method of claim 7, wherein the severity of the candidate anomaly is based on whether the candidate anomaly modifies particular metadata that includes one or more of account information, resource information, cloud provider metadata, and an Internet Protocol (IP) address.

12. The method of claim 7, wherein the one or more resources are labelled in accordance with their respective criticality to facilitate determination of the impact score.

13. A computer system comprising:

one or more processing resources; and instructions that when executed by the one or more processing resources cause the computer system to provide a security service to a particular customer of a cloud environment, including:

training a sequential encoder-decoder machine-learning (ML) model based on historical events associated with infrastructure utilized by the particular customer, wherein the infrastructure is accessible to the particular customer via an application programming interface (API) exposed by the cloud environment providing the infrastructure;

observing an actual API event associated with the infrastructure immediately following a set of contextual events representing a sequence of a predetermined or configurable number of API events relating to the infrastructure that have been logged by the cloud environment to a cloud activity trace;

receiving from the trained sequential encoder-decoder ML model a prediction regarding an API event that is expected to follow the set of contextual events;

determining whether the predicted API event differs from the actual API event;

after a determination that the predicted API event differs from the actual API event, flagging the actual API event as a candidate anomaly for further evaluation;

determining an impact score of the candidate anomaly based on one or more of a severity of the candidate anomaly, a user role associated with the set of contextual events, and one or more resources of the infrastructure affected by the candidate anomaly; and conditionally notifying an administrative user of the particular customer regarding anomalous activity associated with the infrastructure based on the determined impact score.

14. The computer system of claim 13, wherein the cloud activity trace includes information regarding activity of users associated with the particular customer and usage of the API.

15. The computer system of claim 13, wherein conditional notification of the administrative user involves issuance of an anomaly notification to the administrative user responsive to the candidate anomaly being something from which recovery would be difficult or impossible.

16. The computer system of claim 13, wherein the severity of the candidate anomaly is based on one or more of whether the candidate anomaly falls into a critical operations category, whether the candidate anomaly modifies particular metadata, and whether the candidate anomaly satisfies certain time-related criteria.

17. The computer system of claim 13, wherein the severity of the candidate anomaly is based on whether the candidate anomaly modifies particular metadata that includes one or more of account information, resource information, cloud provider metadata, and an Internet Protocol (IP) address.

18. The computer system of claim 16, wherein the one or more resources are labelled in accordance with their respective criticality to facilitate determination of the impact score.

19. The non-transitory machine readable medium of claim 1, wherein conditional notification of the administrative user involves issuance of an anomaly notification to the administrative user based on the candidate anomaly potentially resulting in data loss or financial loss, the candidate anomaly representing a security issue, the candidate anomaly being confirmed as an actual anomaly.

20. The method of claim 7, wherein said conditionally notifying involves issuance of an anomaly notification to the administrative user based on the candidate anomaly potentially resulting in data loss or financial loss, the candidate anomaly representing a security issue, the candidate anomaly being confirmed as an actual anomaly.

21. The computer system of claim 13, wherein conditional notification of the administrative user involves issuance of an anomaly notification to the administrative user based on the candidate anomaly potentially resulting in data loss or financial loss, the candidate anomaly representing a security issue, the candidate anomaly being confirmed as an actual anomaly.

* * * * *